United States Patent [19]

Miura

[11] 3,871,468

[45] Mar. 18, 1975

[54] COURSE CONTROLLING DEVICE FOR A VEHICLE

[75] Inventor: Kimio Miura, Sakado-machi, Saitama-ken, Japan

[73] Assignee: Honda Giken Kogyo Kabushiki Kaisha, Tokyo, Japan

[22] Filed: Oct. 11, 1973

[21] Appl. No.: 405,655

[52] U.S. Cl. ................................ 180/79.2 R, 91/3
[51] Int. Cl. ........................ B62d 5/08, B62d 5/10
[58] Field of Search .......... 180/79.2 R, 79.2 D; 91/3

[56] References Cited
UNITED STATES PATENTS

| | | | |
|---|---|---|---|
| 2,498,284 | 2/1950 | Leonard | 91/3 |
| 2,865,462 | 12/1958 | Milliken et al. | 180/79.2 R |
| 2,902,104 | 9/1959 | Schilling | 180/79.2 R |
| 2,904,120 | 9/1959 | Bidwell | 180/79.2 R |
| 3,576,228 | 4/1971 | Kasselman | 180/79.2 R |

Primary Examiner—David Schonberg
Assistant Examiner—J. A. Pekar

[57] ABSTRACT

A device providing for driving safety which is operable automatically to correct any involuntary change in course of the vehicle as may occur during its travel under the effect of external disturbances such as side wind and road irregularities. It includes a hydraulic actuator for turning the steerable road wheels, a course change detector, a member for transmitting the steering effort exerted on the hand wheel to the hydraulic actuator, and valve means operable with the difference between the fluid pressure output from the course change detector and the force transmitted by said member to control operation of the hydraulic actuator.

2 Claims, 4 Drawing Figures

3,871,468

COURSE CONTROLLING DEVICE FOR A VEHICLE

BACKGROUND OF THE INVENTION

This invention relates generally to the steering of a road vehicle such as an automobile and more particularly to devices for automatically controlling any involuntary change in course of the vehicle due to turning or lateral movement thereof which may occur under external disturbances such as side wind and road irregularities.

SUMMARY OF THE INVENTION

This invention has for its object the provision of a novel course controlling device for a vehicle which is designed to enable the vehicle to be steered at all times exactly in accordance with the steering effort exerted on the steering mechanism of the vehicle by the driver and in this manner makes the vehicle lightly steerable while increasing driving safety by automatically correcting any involuntary change in course of the vehicle as may occur under external disturbances.

According to the present invention, a novel course controlling device for a vehicle is provided which comprises course change detector means giving a fluid pressure output, hydraulic actuator means for turning the steerable road wheels of the vehicle, valve means for controlling supply of pressure fluid to said hydraulic actuator means, and a steering force transmitting member interposed between the steering hand wheel and the steering linkage associated with the steerable road wheels, said valve means being operable with the difference between the output fluid pressure from said course change detector and the steering force transmitted by said force transmitting member.

BRIEF DESCRIPTION OF THE DRAWINGS

The present invention will be described herein in further detail with reference to the accompanying drawings, in which.

DESCRIPTION OF THE PREFERRED EMBODIMENTS

Figure 1:
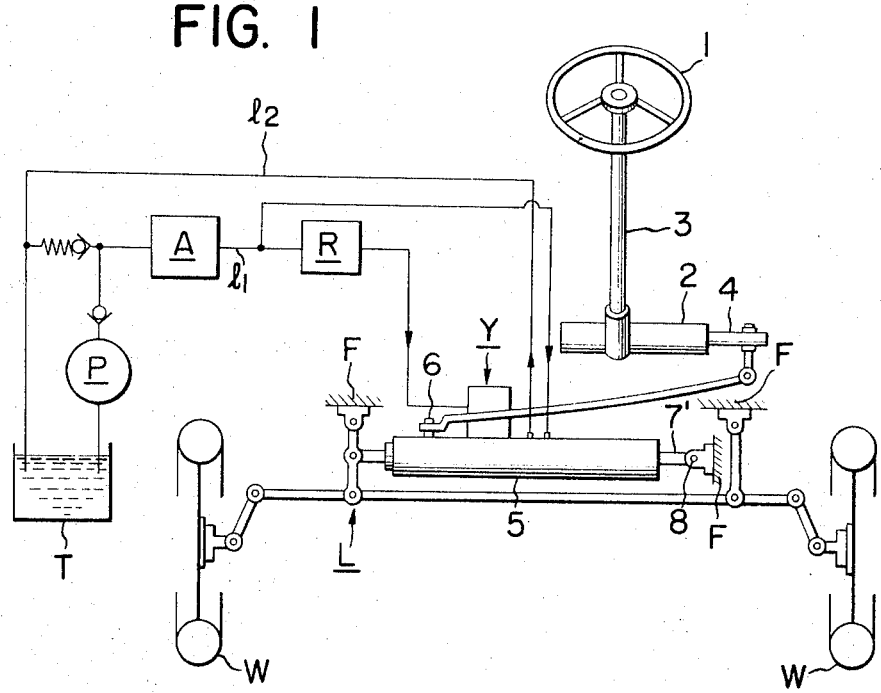
FIG. 1 represents a schematic illustration of a preferred embodiment of the present invention, showing the whole arrangement thereof.

Referring to the drawings and first to FIG. 1, there is shown a course controlling device for a vehicle which embodies the principles of the present invention and is designed to detect change in course of the vehicle as a yaw rate or an angular velocity of the vehicle about a vertical axis.

Reference numeral 1 indicates the steering hand wheel of the vehicle, which is connected with the input member 3 of a known type of steering gear 2. The output member 4 of the steering gear 2 is linked to a steering force transmitting member 6, which presents itself into a movable cylinder type oil hydraulic actuator 5. Formed in one end portion of the movable oil hydraulic cylinder 5 is an oil hydraulic chamber 9 accommodating a piston 7, which is formed integral with a piston rod 7' extending outwardly through the adjacent end wall of the cylinder 5. The piston rod 7' is pivotally secured at the distal end thereof to the frame F of the vehicle. The movable cylinder 5 is connected at the other end with a linkage L which is connected with the steerable road wheels W and operable to steer the latter with lateral movement of the oil hydraulic cylinder 5.

Reference character Y indicates a yaw rate detector for detecting angular movement of the vehicle and associated with the oil hydraulic actuator 5, as will be described later in detail; T indicates an oil reservoir; P, an oil pressure pump; A, an accumulator; R, a pressure regulator arranged in an oil supply line $l_1$; and $l_2$ indicates an oil exhaust line.

Figure 2:
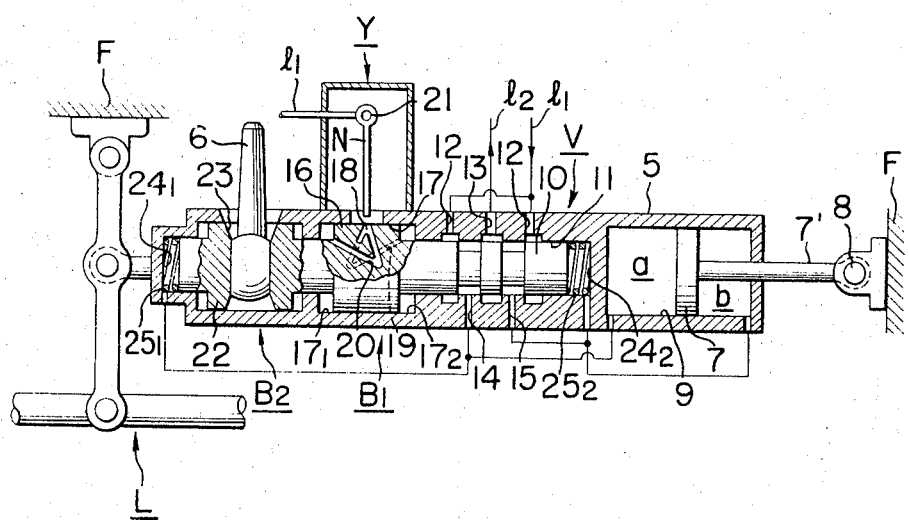
FIG. 2 is a cross-sectional front elevational view of the essential part of the embodiment shown in FIG. 1.

Description will next be made of the construction and arrangement of the hydraulic actuator 5 with reference to FIG. 2.

In addition to the above-described oil hydraulic chamber 9, which accommodates piston 7, the hydraulic actuator cylinder 5 is formed therein with an oil passage connecting the hydraulic chamber 9 with the oil supply line $l_1$, a first pressure receiving region $B_1$ adapted to receive the oil pressure output from the yaw rate detector means Y, and a second pressure receiving region $B_2$ operably held in engagement with the steering force transmitting member 6.

Reference character V generally indicates control valve means arranged in the hydraulic actuator cylinder 5 and comprised of a four-directional spool valve 10 slidably accommodated in a valve chamber 11 formed in the oil passage previously referred to. The valve chamber 11 is provided on one side with oil supply ports 12 and an oil exhaust port 13 respectively connected with the oil supply and exhaust lines $l_1$ and $l_2$, and on the other side with two output ports 14 and 15 respectively connected with the left and right spaces a and b defined in the hydraulic chamber 9 by piston 7. As will readily be understood, the arrangement is such that rightward movement of the spool valve 10 places one of the supply ports 12 and exhaust port 13 in communication with the right and left output ports 15 and 14, respectively, while upon leftward movement of the spool valve 10 the other supply port 12 and exhaust port 13 are placed in communication with the left and right output ports 14 and 15, respectively.

The first pressure receiving region $B_1$ includes a piston 16 formed on the left end of the spool valve 10 integrally therewith and a cylindrical chamber 17 in which piston 16 is accommodated. The piston 16 is formed on one side thereof with a single oil inlet opening 18 in a position opposite to an oil ejecting nozzle N, which will be described later, and a pair of oil passages 19 and 20 are formed in the piston 16 each communicating at one end with the oil inlet opening 18. As shown, the two oil passages 19 and 20 are also in communication with the respective left and right fluid spaces $17_1$, $17_2$ defined in the chamber 17 by the piston 16 on the opposite sides thereof.

The yaw rate detector Y is comprised of a rate gyro, not shown, with the oil ejecting nozzle N secured to the oscillatory shaft 21 of the gyro gymbal for oscillation with the shaft 21. The nozzle N is fed with pressure oil from the pressure regulation R (FIG. 1) and is at all times ejecting such oil to the oil inlet opening 18 formed in the piston 16. With this arrangement, it is to be understood that the ejected oil, entering the inlet opening 18, is distributed into the two oil passages 19 and 20 in a ratio varying with the angle of oscillation of the nozzle N, which represents the yaw rate of the vehicle. In this manner, the left and right fluid spaces $17_1$ and $17_2$ on the opposite sides of the piston 16 are filled with oil to respective pressures with a pressure difference therebetween corresponding to the yaw rate of the vehicle. Although not illustrated in the drawings, the interior space of the yaw rate detector means Y is discharged into the oil tank T so that the oil overflowing from the port 18 can be returned to the latter.

The second pressure receiving region $B_2$ of the hydraulic actuator cylinder 5 comprises a thrust element 22 formed on the left end of the piston 16 integrally therewith with an engagement hole 23 formed in the thrust element 22 for fitting engagement with the steering force transmitting member 6 described hereinbefore. The arrangement is such that the steering force is transmitted through the member 6 to the thrust element 22 to act against the axial pressure occurring in the above-described first pressure receiving region $B_1$.

Reference numerals $24_1$ and $24_2$ indicate respective reaction chambers of one and the same diameter formed in the hydraulic actuator cylinder 5 to receive the respective adjacent end portions of the spool valve 10 and the thrust element 22 with coiled compression springs $25_1$ and $25_2$ arranged in respective reaction chambers $24_1$ and $24_2$ to resiliently hold the whole piston unit, including spool valve 10, piston 16 and thrust element 22, in its neutral position.

Description will next be made of the manner in which the course controlling device operates.

During travel of the vehicle, when the hand wheel 1 is turned by the driver, for example, in a clockwise direction, the thrust element 22 is driven to the right by the steering force transmitting member 6 together with the spool valve 10 so that the supply and exhaust ports 12 and 13 are placed in communication with the right and left output ports 15 and 14, respectively, to feed pressure oil to the right-hand side space b in the hydraulic chamber 9 with the result that the hydraulic actuator cylinder 5 is driven to the right to turn the steerable road wheels W,W to the right through the medium of linkage L.

As the result, the vehicle is steered to the right producing a yaw rate in a clockwise direction thus to cause the oil ejecting nozzle N to oscillate to the left. This results in an increase of the rate of oil flow into the oil passage 19 and the oil pressure in the right-hand side fluid space $17_2$ is accordingly raised to counteract the rightward thrust of the steering force transmitting member 6 acting upon the thrust element 22.

On this occasion, if, on account of some slip occurring between the steered wheels W,W and the road surface, the vehicle is not steered to such an extent as exactly corresponds to the amount of steering motion given to the hand wheel, the actual yaw rate of the vehicle will not be enough to raise the oil pressure in the fluid space $17_1$ to such an extent as to counteract the rightward thrust of the steering force transmitting member 6. As the result, the spool valve 10 will continue to move to the right, causing further rightward movement of the actuator cylinder 5.

Contrariwise, if the vehicle is steered in excess, for example, on account of side wind acting upon the vehicle in the steering direction, the leftward oil pressure force acting upon the piston 16 is increased to exceed the rightward thrust of the steering force transmitting member 6 so that the spool valve 10 is moved back to the left to correct the excessive rightward movement of the actuator cylinder 5. In this manner, the vehicle steered is automatically controlled to take a course exactly corresponding to the steering effort of the driver.

Similarly, in the event that the vehicle is forced to yaw and its course disturbed by side wind or road irregularities while the hand wheel 1 is free from any steering effort, an oil pressure is produced in the first pressure receiving region $B_1$ which acts upon the piston 16 in a direction to restore the vehicle course and the actuator piston unit including spool valve 10 functions in substantially the same manner as described above to automatically correct the vehicle course disturbed.

Figure 3:
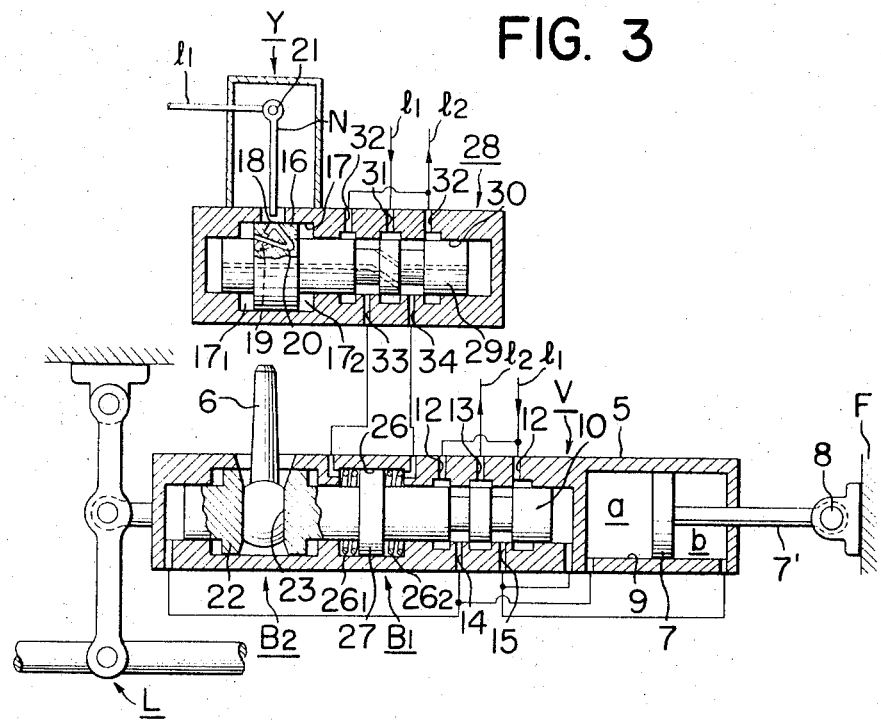
FIG. 3 is a view similar to FIG. 2, showing a modification of the essential part shown in FIG. 2.

FIG. 3 illustrates another embodiment of the present invention, which is designed so that the output of the yaw rate detector Y may be amplified. As shown, the yaw rate detector Y and the piston 16 associated therewith as well as the chamber 17 in which the piston 16 is accommodated are arranged exteriorly of the hydraulic actuator cylinder 5 with a hydraulic chamber 26 formed in the first pressure receiving region $B_1$. Accommodated in the hydraulic chamber 26 is a piston 27 formed integral with the spool valve 10 and thrust element 22 and defining a left and a right pressure oil space $26_1$ and $26_2$ in the chamber 26. On the other hand, amplifier means is arranged sidewise of the piston 16 associated with the yaw rate detector Y, as generally indicated at 28. The amplifier means 28 is comprised of a four-directional spool valve 29 accommodated in a chamber 30, which is formed on one side with a supply port 31 and two exhaust ports 32, communicating with oil supply and exhaust lines $l_1$ and $l_2$, respectively, and on the other side with a left and a right output port 33 and 34, respectively, communicating with the said left and right pressure oil spaces $26_1$ and $26_2$ in the first pressure receiving region $B_1$. As will readily be understood, the supply and exhaust ports 31 and 32 are placed in communication with the respective right and left output ports 34 and 35 upon leftward movement of the spool valve 10 and with the respective left and right output ports 35 and 34 upon rightward movement thereof. With this arrangement, the spool valve 29 is operable under the control of the relatively slight oil pressure output of the yaw rate detector Y, acting upon the piston 16, to feed the first pressure receiving region $B_1$ with an amplified or raised oil pressure, which is proportional to the output oil pressure of the yaw rate detector Y.

Figure 4:
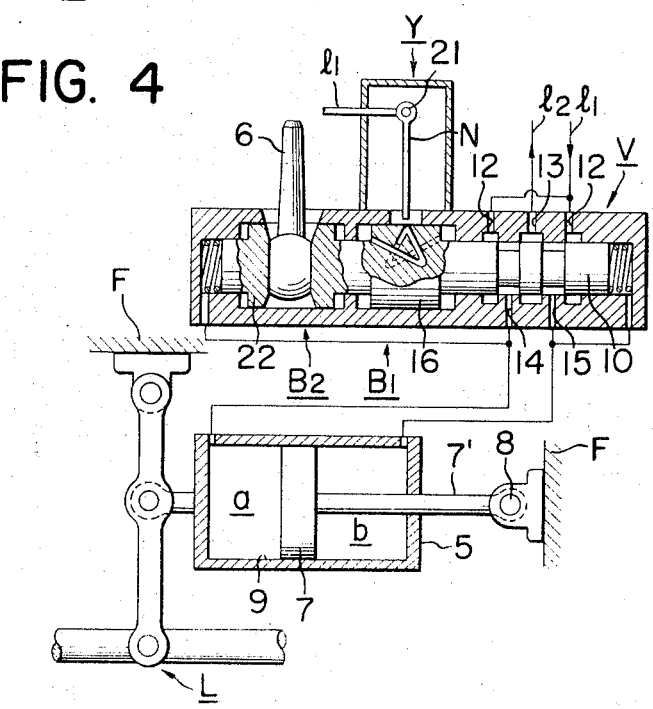
FIG. 4 illustrates another modification of the essential part shown in FIG. 2.

Another embodiment of the present invention is shown in FIG. 4, in which first and second pressure receiving regions $B_1$ and $B_2$ are also arranged exteriorly of the hydraulic cylinder 5. With this arrangement, it will be noted that there is no kick-backing of the hydraulic actuator 5 to the hand wheel 1 as the actuator cylinder is not mechanically associated with the steering force transmitting member 6 by any means and that the control means V including spool valve 10 and associated parts can be assembled and disassembled independently from the hydraulic actuator 5, thus facilitating maintenance and inspection of such components.

It will be appreciated from the foregoing description that, according to the present invention, the steerable road wheels can be turned lightly under the steering force multiplied by the hydraulic actuator means, which is controlled by valve means operable in accordance with the difference between the output of a course change detector and the force transmitted through the steering motion transmitting member, and that the angle of turning of the steerable road wheels is automatically corrected so as to make the actual extent to which the vehicle is steered correspond to the steering effort. This enables the vehicle to run with high stability even when the vehicle is subjected during its travel to external disturbances such as side wind which may otherwise disturb the course of the vehicle. Moreover, with the device of the invention, the steering effort is transmitted directly to counteract the pressure output of the course change detector means and thus can be compared with the detector output exactly without delay.

While a few preferred embodiments of the invention have been shown and described, it will be apparent to those skilled in the art that many changes and modifications may be made therein without departing from the spirit of the invention or from the scope of the appended claim.

What is claimed is:

1. A course controlling device for a vehicle having steerable road-engaging wheels, comprising hydraulic actuator means operable to turn the steerable wheels of the vehicle, said hydraulic actuator means including an oil hydraulic cylinder having an oil hydraulic chamber therein, a piston slidably accommodated in said chamber and defining therein a pair of left and right spaces; a source of pressure oil; oil lines communicating between said source of pressure oil and said left and right spaces of said chamber; a course change detector means for detecting any change in course of the vehicle; control valve means comprising a spool valve, said spool valve being disposed in said oil lines between said source of pressure oil and said left and right spaces for selectively placing the former in communication with either of the latter; a first pressure receiving region including a piston formed integrally with said spool valve and a pair of left and right fluid spaces defined by said last-mentioned piston on opposite sides thereof, said fluid spaces being disposed on the output side of said course change detector means so as to receive pressure oil from the latter in respective amounts varying with the detected course change of the vehicle; a second pressure receiving region including a thrust element formed integrally with said spool valve, and a steering force transmitting member operably connecting said thrust element with the steering wheel of the vehicle so as to transmit a steering force from the steering wheel to said thrust element, said oil hydraulic cylinder incorporating therein said control valve and said first and second pressure receiving regions each in coaxial relation therewith, whereby said control valve means is operable under a pressure differential produced between said first and second pressure receiving regions to control said hydraulic actuator means.

2. A course controlling device according to claim 1, comprising an amplifier means interposed between said first pressure receiving region and said course change detector means for amplifying the output of the latter.

* * * * *